US012371307B2

(12) United States Patent
Gril

(10) Patent No.: US 12,371,307 B2
(45) Date of Patent: Jul. 29, 2025

(54) MOBILE TELESCOPIC HYDRAULIC CRANE

(71) Applicants: Branko Gril, Prestranek (SI); TAJFUN LIV, PROIZVODNJA IN RAZVOJ D.O.O., Postojna (SI)

(72) Inventor: Branko Gril, Prestranek (SI)

(73) Assignee: TAJFUN LIV, PROIZVODNJA IN RAZVOJ D.O.O. (SI)

(*) Notice: Subject to any disclaimer, the term of this patent is extended or adjusted under 35 U.S.C. 154(b) by 350 days.

(21) Appl. No.: 18/000,376

(22) PCT Filed: Jun. 1, 2021

(86) PCT No.: PCT/SI2021/000005

§ 371 (c)(1),
(2) Date: Nov. 30, 2022

(87) PCT Pub. No.: WO2021/251909

PCT Pub. Date: Dec. 16, 2021

(65) Prior Publication Data

US 2023/0219792 A1 Jul. 13, 2023

(30) Foreign Application Priority Data

Jun. 12, 2020 (SI) ................................ P-202000105

(51) Int. Cl.
*B66C 1/42* (2006.01)
*B66C 23/00* (2006.01)
(Continued)

(52) U.S. Cl.
CPC .............. *B66C 23/54* (2013.01); *B66C 1/427* (2013.01); *B66C 23/44* (2013.01); *B66C 23/705* (2013.01);
(Continued)

(58) Field of Classification Search
CPC .. B66C 1/42; B66C 1/427; B66C 3/16; B66C 13/12; B66C 23/16; B66C 23/36;
(Continued)

(56) References Cited

U.S. PATENT DOCUMENTS 4,034,875 A * 7/1977 Pugh .................... B66F 9/0655
414/718
5,924,837 A * 7/1999 Passmann ............ B66C 23/701
414/718
(Continued)

FOREIGN PATENT DOCUMENTS

CN 203187322 U * 9/2013
EP 1842823 A1 * 10/2007 .......... B66C 23/703
(Continued)

OTHER PUBLICATIONS

International Search Report and Written Opinion issued in PCT App. No. PCT/SI2021/000005 dated Sep. 24, 2021 (12 pages).
(Continued)

*Primary Examiner* — Anna M Momper
*Assistant Examiner* — Henrix Soto
(74) *Attorney, Agent, or Firm* — Haynes and Boone, LLP; William B. Nash; Brooke Parker

(57) ABSTRACT

The present disclosure refers to a mobile telescopic hydraulic crane, which may include at least one service opening in a terminal portion of a telescopic section adjacent to at least one hydraulic connector, wherein said at least one service opening is configured to allow access for a hand tool from the outside of the telescopic section to establish or disassemble a hydraulically sealed connection between a flexible hydraulic pipe and associated hydraulic connector within said telescopic arm. The at least one service opening allows for a quick and simple replacement of each hydraulic pipe
(Continued)

within the telescopic secondary arm without significantly reducing the carrying capacity and reach of the crane.

4 Claims, 3 Drawing Sheets

(51) Int. Cl.
*B66C 23/44* (2006.01)
*B66C 23/70* (2006.01)
*B66C 23/78* (2006.01)

(52) U.S. Cl.
CPC ...... *B66C 23/78* (2013.01); *B66C 2700/0371* (2013.01)

(58) Field of Classification Search
CPC ......... B66C 23/42; B66C 23/44; B66C 23/54; B66C 23/68; B66C 23/701; B66C 23/702; B66C 23/705
USPC .......................................................... 212/300
See application file for complete search history.

(56) References Cited

U.S. PATENT DOCUMENTS

| | | | | |
|---|---|---|---|---|
| 9,815,669 | B2 * | 11/2017 | Magni | B66C 13/14 |
| 2013/0216343 | A1 * | 8/2013 | Johannes | B66C 3/16<br>414/680 |
| 2018/0273350 | A1 * | 9/2018 | Steindl | B66C 3/20 |

FOREIGN PATENT DOCUMENTS

| | | | | | |
|---|---|---|---|---|---|
| EP | 2947037 | A1 * | 11/2011 | | B66C 13/12 |
| EP | 2520530 | A1 | 11/2012 | | |
| EP | 2712836 | A1 * | 4/2014 | | B66C 13/12 |
| EP | 3640514 | A1 | 4/2020 | | |
| JP | 11180681 | A * | 7/1999 | | |
| WO | 98/17576 | A1 | 4/1998 | | |

OTHER PUBLICATIONS

"We Introduce the New Cranab Crane: TZ18," Trans Gruas, Feb. 24, 2020, retrieved from the internet: https://www.transgruas.com/en/pl66/news/id924/nueva-grua-forestal-cranab-tz18.htm.

* cited by examiner 4
41
42
43
44
45
48
48'
5
431
432
440
442
452
455

MOBILE TELESCOPIC HYDRAULIC CRANE

CROSS-REFERENCE TO RELATED APPLICATIONS

This application is a United States national phase application of co-pending International Patent Application No. PCT/S12021/000005, which claims the benefit of Slovenia Patent Application No. P-202000105 filed 12 Jun. 2020, both of which are hereby incorporated herein by reference in their entirety.

BACKGROUND

The present disclosure refers to a mobile telescopic hydraulic crane, namely a crane with a telescopic secondary arm, which comprises tubular bearing sections, which are inserted within each other, such that said secondary arm of the crane is telescopically extendable and is at the same time also adapted to receive flexible hydraulic pipes, which are passing therethrough and which represent a part of a suitable hydraulic circuit between the hydraulic aggregate and the hydraulic driving means, wherein each of said hydraulic pipe extends via a guiding reel, which is arranged inside the corresponding tubular bearing section of said telescopic arm. According to the International Patent Classification such inventions belong to the class B 66 C 23/70.

The present disclosure is based on a problem of how to ensure a quick and simple replacement of hydraulic pipes. The pipes may be mounted within a telescopic secondary arm, which provides a simple and cheap solution without negatively impacting carrying capacity and reach of the crane as such.

Mobile telescopic hydraulic cranes are known in the art and many of them are also disclosed in the patent literature, e.g. in EP 2 789 566 A1, EP 2 683 645 A1, WO 98/17576 A1, and many other sources. A telescopic mobile hydraulic crane typically comprises a carrying platform, which can be mounted onto a vehicle and is generally fitted with at least two telescoping support legs, which are suitable for supporting the crane during use, by providing stability against leaning and tipping over of the crane and/or vehicle, especially while carrying loads. A column is attached on said platform, in such a manner that it can be rotated around the vertical geometric axis by a suitable driving means, wherein on the terminal portion of said column a primary arm of the crane is attached with its first terminal portion such that it can be pivoted around the horizontal geometric axis and is simultaneously supported by means of a hydraulic cylinder, which is pivotally attached to said column. On the opposite free second terminal portion of the primary arm, a telescoping secondary arm is attached, which is also pivotable around the horizontal geometric axis. Said secondary arm is pivotable around said horizontal geometric axis and relative to said primary arm by means of a hydraulic cylinder, which is on one side pivotally connected to the primary arm and on the other side either directly or indirectly connected to the secondary arm by means of a suitable linking mechanism. Said telescoping secondary arm consists of at least two tubular bearing sections, which are inserted within each other, wherein each internal section can either be retracted in the axial direction into the interior of each external bearing section, or optionally also extended to a certain extent from the external bearing section, which is usually performed by means of a roller chain, wherein a sufficient overlapping area must be preserved between the sections in order to ensure the required bending strength of such an assembly and consequently the required carrying capacity of the crane. On the free terminal portion of the internal section there is an attachment point, to which either directly or indirectly a grabber is attached by means of a suitable hydraulic rotational unit, which is suitable for manipulating a load, and may be driven by a hydraulic driving means. In such cranes, in order to enable energizing and controlling of said driving means on the free terminal portion of the internal bearing section of said telescopic secondary arm, a suitable hydraulic interconnection needs to be established between said driving means and the hydraulic aggregate, which is generally located in the area of the initially mentioned platform and substantially outside each operational area of the rotatable column and said pivotable arms. For this purpose, suitable hydraulic pipes are contemplated, which may extend from the associated hydraulic connectors on said free terminal portion of the internal bearing section of the telescopic secondary arm towards the associated connectors located on the external bearing section of the telescopic secondary arm, and from there further to the primary arm and subsequently from said primary arm to the column, and finally towards the hydraulic aggregate. Said hydraulic connectors are connected with each other via suitable sections of hydraulic conduits, which can in certain areas be rigid such as metallic pipes, while in other areas said conduits must be flexible and capable of following movements of the arms and the column and therefore need to consist of sufficiently flexible materials, such as reinforced rubber or other flexible reinforced polymer-based materials. In certain embodiments, said hydraulic conduits are installed on the external surface of the arms, including the telescopic arm, while in other embodiments, the conduits are installed within the interior of the tubular column, tubular primary arm and also inside of the telescopically conceived secondary arm. Although much more complicated, this approach may contribute to improvements in reliability of the crane operation, because such integrated hydraulic pipes are not exposed to atmospheric impacts or to potential physical damages due to collisions or other interactions with other objects in their proximity during the operation of the crane.

When said flexible hydraulic pipes are installed within the interior of the telescopic secondary arm, each pipe passes from the hydraulic connector on the external tubular bearing section towards the free terminal area of the internal section of the telescopic secondary arm, which protrudes outwardly therefrom. The flexible pipe must allow the movements of said bearing sections relative to each other and extends from the first terminal position, in which the internal section is retracted into the interior of the external section, to the second terminal position, in which the internal section is almost completely extended out from the external section, or vice versa. Consequently, each hydraulic pipe is in the transition area between the external section and the internal bearing section of the telescopic arm that is relatively intensively bent and is moreover guided via the guiding reel, upon which it passes along the interior of the internal bearing section towards the hydraulic connector on the free terminal portion of the internal bearing section. During operation of the telescopic arm, the hydraulic pipe is successively bent and guided via the guiding reel, which also leads to unavoidable wearing, by which during the use of the crane decreases the thickness of the hydraulic pipe wall over time. For this reason the crane has to be occasionally serviced due to replacement of said hydraulic pipes, although the leakage of pipes may also occur for other reasons. In any case it must be ensured that the hydraulic pipes can be replaced, wherein the hydraulic connectors are usually located within the interior of the tubular bearing section and are herewith better protected there against exposure to the external impacts during the use and during transporting of the crane on a motor vehicle. Therefore, the replacement of each hydraulic pipe on such known cranes is possible only in such manner, that after the disassembly of the grabber the telescoping secondary arm is practically completely dismounted and disassembled, wherein the internal bearing section is pulled out from the external bearing section, upon which both terminal portions of such faulty or worn out hydraulic pipe is removed from the hydraulic connectors and replaced with another hydraulic pipe. Upon replacement, the telescopic arm can be reassembled again, and the grabber may also be re-attached. Such an operation requires a significant amount of work and time, and is particularly problematic when such operation cannot be carried out in a specialized workshop, but rather on the spot, where the crane was transported for the purpose of being used.

A two-part telescopic arm of a crane is known from EP 2 135 836, within which several flexible hydraulic pipes are embedded. Such a telescopic arm comprises an external tubular bearing section of a determined length, which is on its one terminal portion pivotally connected to the primary arm of the crane by means of a suitable joint, while on its remaining terminal portion an internal tubular bearing section is inserted into it, on the external terminal portion of which there is a mounting point, which is available for attaching an operational assembly, e.g. a grabber. Each movement of said bearing sections of the telescopic arm relative to each other is performed by using a roller chain, which is attached to a block, which is installed on the external tubular bearing section of the telescopic arm. Said block is adapted to receive hydraulic connectors which are suitable for connecting the hydraulic pipes extending along the interior of the telescopic arm. The hydraulic connectors should not stick out of the area of the telescopic arm due to the risk of damaging them during the use of the crane, such that said hydraulic connectors are arranged inside the telescopic arm and are therefore located at an offset from the very end of the arm. However, the hydraulic connectors must still remain accessible, so that it is possible to remove hydraulic pipes in the case of damage or wear. For this purpose the external section of the telescopic arm is cutaway at an angle and the cut part is replaced with a cover, which is detachably installed over the cutaway area, such that hydraulic connectors are suitably protected, but can still be accessed when needed. Unfortunately, such a measure of cutting away the external outer bearing tubular section of the telescopic arm consequently leads to a significant decreasing of the operational area of the crane, namely the area in the case of a completely extended telescopic arm, in which both the internal and the external bearing section still remain sufficiently overlapped by each other in order to ensure the required bending strength and carrying capacity of the crane, which means that said angled cutaway of the external bearing section actually leads to either a reduced carrying capacity or a reduced reach of the crane. The length of the telescopic arm in mobile cranes is generally limited by the width of the vehicle on which the crane is installed, which has to be taken into account, such that a mobile crane complies with enforced road traffic regulations. Therefore, it is beneficial to enable access to said hydraulic connectors without any modifications within the area of mutually overlapping of internal and external tubular bearing sections of the telescopic arm which could lead to reduction of carrying capacity or shortening of the telescopic arm and consequently the reach of the crane.

The present disclosure refers to a mobile telescopic hydraulic crane, namely a crane which comprises a carrying platform, which is suitable for mounting the crane on a motor vehicle and is optionally fitted with at least one pair of telescopic legs suitable for supporting the crane on the ground and consequently for ensuring the required carrying capacity and stability of said crane. Such crane further comprises a column, which has a first terminal portion that acts as a cantilever attached to said platform such that it can be rotated around the vertical axis, while on the free second terminal portion of said column a primary bearing arm of the crane is attached in the area of its first terminal portion such that it can be pivoted around the horizontal axis, wherein said primary arm is supported on said column and can be pivoted around said horizontal geometric axis by means of a hydraulic cylinder, which is on the one hand pivotally attached to said column, and is on the other hand attached to said primary arm. On the second terminal portion of said primary arm, a telescoping secondary bearing arm is attached with its first terminal portion such that it can be pivoted around the horizontal geometric axis, wherein said secondary bearing arm is on its second terminal portion furnished with an attachment point for mounting a grabber or another suitable assembly for manipulating a load. Said telescopic secondary arm is supported on the primary arm and can be pivoted around said horizontal geometric axis by means of a hydraulic cylinder, which is pivotally connected to the primary arm and the second arm, respectively, directly or indirectly via a suitable transmission mechanism. Said secondary arm comprises at least two tubular bearing sections, which are inserted within each other, so that said tubular bearing sections are by means of a suitable driving means moveable relative to each other in their axial direction in such manner that the external tubular bearing section is suitable for establishing a connection with the primary arm and attachment to a hydraulic cylinder, while the internal tubular bearing section within the external tubular bearing section is on its free end portion furnished with said attachment point for mounting a grabber. On the free terminal portion of the external tubular bearing section of the telescopic secondary arm at least one hydraulic connector is contemplated, which enables the hydraulic medium to flow from the available hydraulic aggregate, while also on the free terminal portion of the internal tubular bearing section of the telescopic secondary arm at least one hydraulic connector is contemplated, which enables the hydraulic medium to flow towards said grabber and/or towards its corresponding hydraulic rotational unit, wherein said hydraulic connectors are connectable with each other by means of a flexible hydraulic pipe, which is connected which each of said hydraulic connectors in a hydraulically sealed manner, however also in a detachable manner and maintaining the ability of being disconnected and reconnected when required. Said flexible hydraulic pipe extends along the interior of said telescopic secondary arm, namely between the hydraulic connector on the free terminal portion of the external tubular bearing section and the hydraulic connector on the free terminal portion of the internal tubular bearing section, in the transition area from the external tubular bearing section into the internal tubular bearing section which may be relatively sharply bent and guided thereby via a guiding reel.

The present disclosure proposes at least one service opening, which is provided in the area of said telescoping secondary arm, namely on its free terminal portion and at a suitable distance apart from the free terminal portion of said external tubular bearing section in the area at least one hydraulic connector for connecting of each flexible hydraulic pipe, which is connectable with an associated hydraulic connector on the free terminal portion of the internal tubular bearing section, wherein said service opening has a suitable shape and dimensions, which are sufficiently extensive to allow access therethrough from the outside of the telescopic arm to each suitable hand tool, which is suitable either for establishing or for disassembling of said hydraulically sealed connection between said flexible hydraulic pipe and each corresponding hydraulic connector within said telescopic arm.

In a preferred embodiment of the present disclosure said at least one service opening is available as a cut-out with slightly rounded corners and edges. The position of the at least one service opening may take into consideration a position of the crane in the area of its maximum reach during its use, and positioned in the area of said at least one hydraulic connector within the external tubular bearing section, and at least approximately in the area of the upper surface of each external tubular bearing section of said telescoping secondary arm, which may face away from the ground.

In a further embodiment of the present disclosure, which may be preferred in particular if more hydraulic connectors are contemplated, two service openings are contemplated, which are spaced apart from each other in a transversal direction of the telescopic arm and are at least approximately equally spaced apart from the first terminal portion of said telescopic arm, wherein said service openings are, again by taking into consideration the position of the crane in the area of its maximum reach during its use, positioned substantially in an area of said at least one hydraulic connector within the external tubular bearing section, and at the same time at least partially positioned in the area of the upper surface of each external tubular bearing section of the telescopic secondary arm, which may face away from the ground.

Still further, said at least one service opening can be at least partially or completely coverable with a removable cover.

BRIEF DESCRIPTION OF THE DRAWINGS

The present disclosure will be further explained by means of an embodiment, which is presented in the attached drawings, in which.

DETAILED DESCRIPTION

Figure 1:
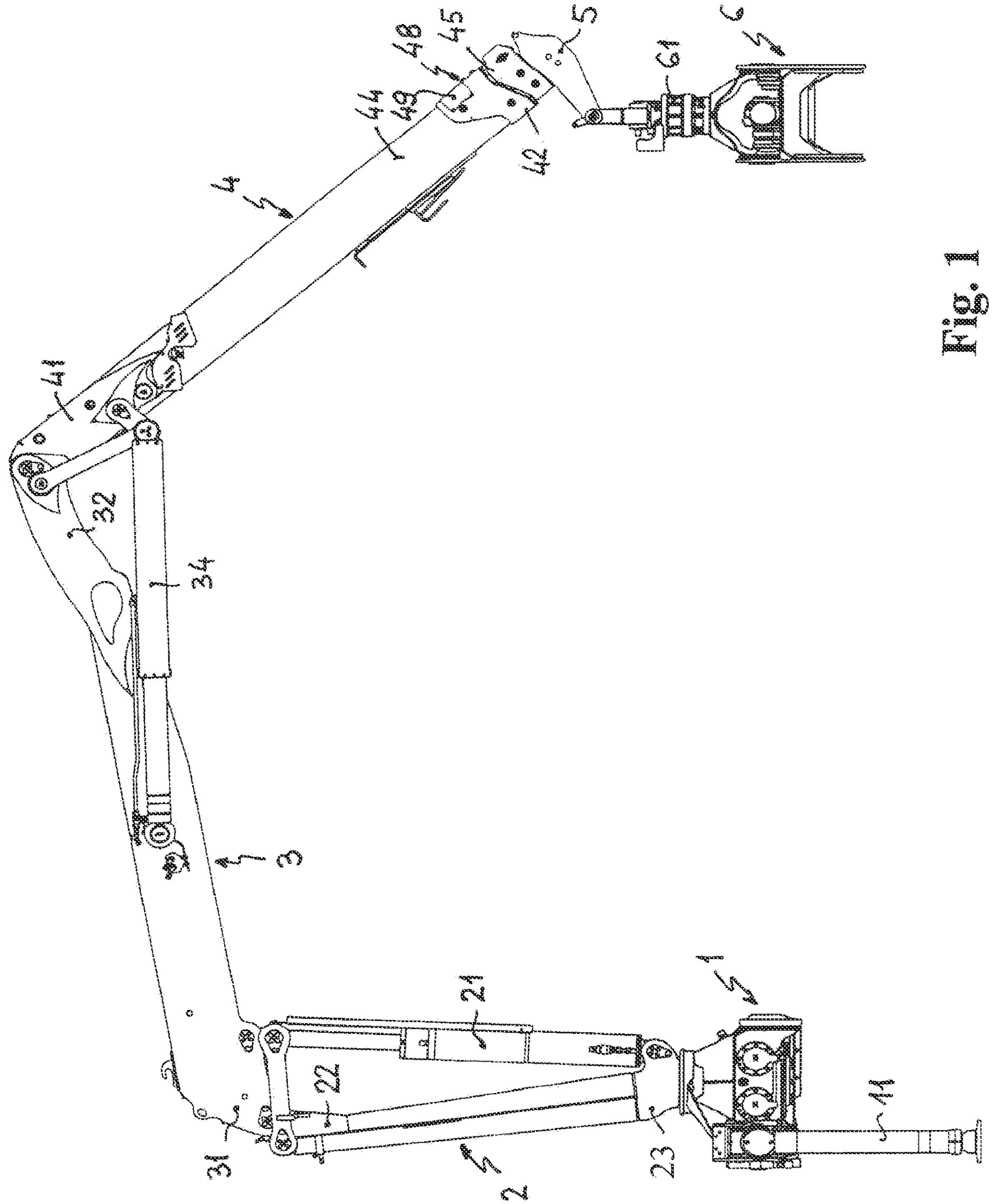
FIG. 1 is a mobile hydraulic crane in isometric view.
Figure 2:
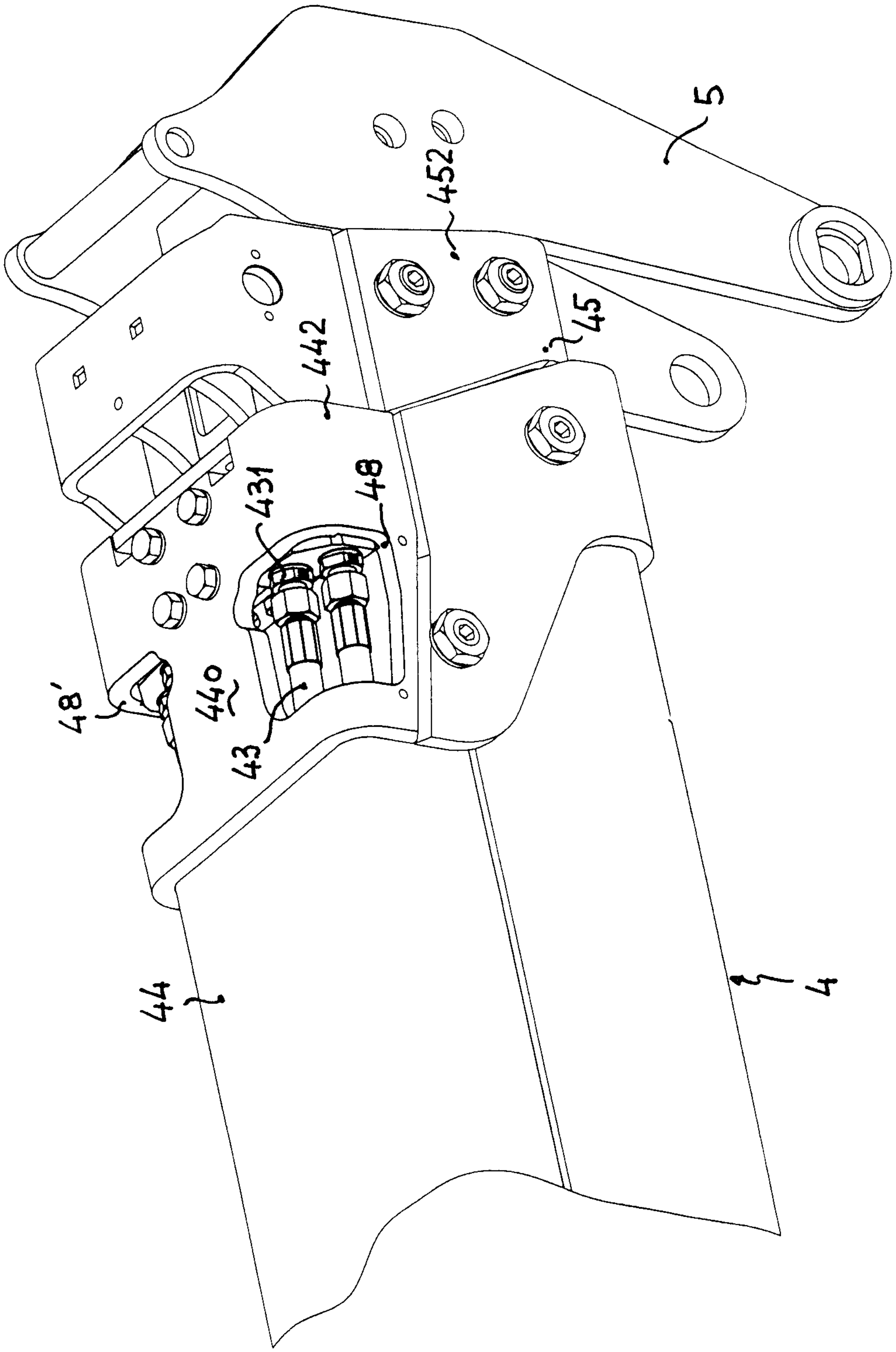
FIG. 2 is a terminal area of a telescopic secondary arm of the crane according to FIG. 1, also in isometric view.
Figures 3, 4, 5, 6, 7:
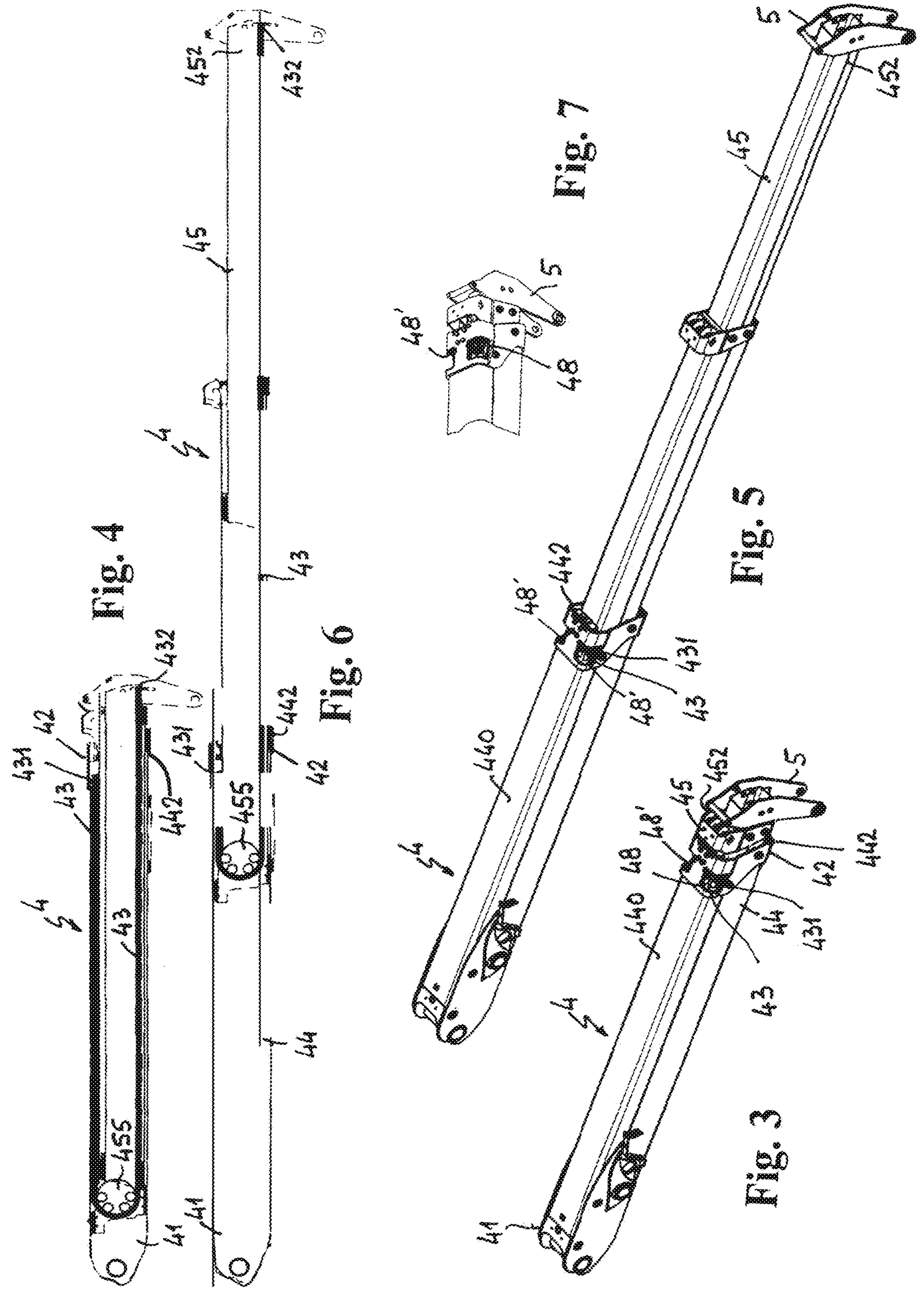
FIG. 3 is a telescopic secondary arm of the crane according to FIG. 1 in its initial position with completely retracted and mutually overlapping tubular bearing sections positioned within each other, also in isometric view.
FIG. 4 is a longitudinal cross section of a telescopic secondary arm according to FIG. 3 and of the crane according to FIG. 1.
FIG. 5 is a telescopic secondary arm of the crane according to FIG. 1, in a completely extended position, namely with bearing sections, which are still inserted within each other but just partially overlapped, also in isometric view.
FIG. 6 is a telescopic secondary arm according to FIG. 5 of the crane according to FIG. 1, and is shown in a longitudinal cross section in the central vertical plane.
FIG. 7 is a detailed view of the terminal area of the telescopic secondary arm of the crane according to FIG. 1, which is in an enlarged scale as shown in FIG. 2.

A mobile telescopic hydraulic crane according to the present disclosure is shown in FIG. 1 and comprises a carrying platform 1, which is suitable for mounting the crane on a motor vehicle and is optionally furnished with at least one pair of telescopic supporting legs 11, which are intended for supporting of the crane on the ground when a carried load is being moved, and consequently for ensuring the carrying capacity and stability of said crane. Although not shown in the drawings, a hydraulic aggregate can be optionally mounted in the area of said platform 1 together with a suitable reservoir and a pump, which then serve for compressing the hydraulic medium for supplying and optionally controlling the hydraulic driving means on said crane.

A column 2 is attached to said platform 1 with its first terminal portion 23 comprising a bracket such that it can be rotated around the vertical axis, wherein on the remaining free terminal portion 22 of said column 2 a primary bearing arm 3 of the crane is attached such that it can be pivoted around the horizontal axis at its first end portion 31. Said primary arm 3 is supported on said column 2 and can be rotated around said horizontal geometric axis by means of a hydraulic cylinder 21, which is on the one side pivotally attached to said column 2, and is on the other side attached to said primary arm 3. On the free end portion 32 of said primary arm 3, a telescoping supporting secondary bearing arm 4 is attached thereto in the area of its first terminal portion 41 such that it can be pivoted around the horizontal geometric axis, wherein said secondary arm 4 is on its remaining terminal portion 42 furnished with an attachment point 5, which is adapted for mounting a grabber 6 or any other suitable appliance for manipulating a load, wherein said telescopic secondary arm 4 is supported by primary arm 3 and can also be pivoted around said horizontal geometric axis by means of a hydraulic cylinder 34, which is pivotally connected to the primary arm 3 and secondary arm 4 either directly or indirectly via a suitable transmission mechanism.

Said secondary arm 4 may be telescopic and comprises at least two tubular bearing sections 44, 45, which are inserted within each other, such that said tubular bearing sections 44, 45 are moveable relatively to each other in their axial direction by using a suitable driving means such that the external tubular bearing section 44 can ensure a required connection with the primary arm 3 and attachment to a hydraulic cylinder 34, while the internal tubular bearing section 45 within the external tubular bearing section 41 is on its free terminal portion 452 furnished with said attachment point 5 for mounting a grabber 6 or a similar means of manipulating a load.

Said telescopic secondary arm 4 is separately presented in FIGS. 2-7. It may generally consist of just two tubular bearing sections 44, 45, which are inserted within each other, but the embodiment according to FIGS. 3-7 comprises three sections such that the present disclosure as such should be interpreted such that the expression "internal" bearing section 45 logically represents the inner bearing section, namely the innermost bearing section.

On the free terminal portion 442 of the external tubular bearing section 44 of the telescopic secondary arm 4, at least one hydraulic connector 431 may be located, which enables the hydraulic medium to flow from the available hydraulic aggregate, and on the other hand, on the free terminal portion 452 of the internal tubular bearing section 45 of said telescopic secondary arm 4, there is also at least one hydraulic connector 432, which enables the hydraulic medium to flow towards said grabber 6 and/or towards its corresponding hydraulic rotational unit 61. Two corresponding hydraulic connectors 431, 432 on each side are connectable with each other by means of a flexible hydraulic pipe 43, which is detachably connected to each one of said hydraulic connectors 431, 432 in a hydraulically sealed manner, maintaining the ability of being disconnected and reconnected, when required. Said hydraulic pipe 43 may be a reinforced flexible pipe, which is equipped with connectors on both ends, which are connectable to said hydraulic connectors 431, 432, wherein said connection can be established by means of commonly used hand tools, e.g. a wrench for tightening nuts, or the like.

As evident from FIGS. 3-6, said flexible hydraulic pipe 43 extends within said telescopic secondary arm 4, namely from the first hydraulic connector 431 on the free terminal portion 442 of the external tubular bearing section 44 towards the second hydraulic connector 432 within the free terminal portion 452 within the internal tubular bearing section 45. In the transition area between the external tubular bearing section 44 and the internal tubular bearing section 45, the flexible hydraulic pipe 43 may be relatively sharply bent and also guided by means of a guiding reel 455. In the crane according to the present disclosure, at least one service opening 48, 48' is contemplated in the area of said telescopically conceived secondary arm 4. It is arranged on the free terminal portion 42 of said telescopic arm 4 and in particular at a suitable distance apart from the free terminal portion 442 of said external tubular bearing section 44, namely in the area of at least one hydraulic connector 431 for connecting of said hydraulic pipe 43, which is on the other side connectable with the hydraulic connector 432 on the free terminal portion 452 of the inner tubular bearing section 45.

Each service opening 48 is available in such shape and size that it allows each required hand tool to pass therethrough from the outside of the telescopic arm 4 for the purpose of accessing the interior of each telescopic arm 4 in order to either establish or disassemble said hydraulically sealed connection between each flexible hydraulic pipe 43 and each corresponding hydraulic connector 431 within the telescopic arm 4. The shape and dimensions of each service opening 48, 48' are substantially determined in such way that a user is enabled to place a wrench on the nut of the hydraulic connector 431, so that the nut can be rotated at least approximately 30°, which is generally sufficient for gradually tensioning or releasing of the nut. According to the present disclosure it is contemplated that the size and the shape of each service opening 48, 48' is such, that it enables such operation, without reducing the carrying capacity of the external carrying section 44 of each telescopic arm 4 even when telescopic arm is fully extended, or in other terms, that also the maximum effective reach of the crane at a predetermined carrying capacity of said crane can be maintained.

In the view of ensuring the required bending strength and by taking into account dynamic stresses within the telescopic arm 4, said at least one service opening 48 is preferably available as a cutout with slightly rounded corners and edges. The at least one service opening 48, 48' may be located in the area of said at least one hydraulic connector 431 within the external tubular bearing section 44, but in addition to that also at least approximately in the area of the upper surface 440 of the external tubular bearing section 44 of said telescopically conceived secondary arm 4, which may face away from the ground to provide accessibility for repairs even during extension of the crane during use.

In the embodiment according to FIGS. 3-6, namely in the case of a crane with a grabber 6 and a rotational unit 61, several hydraulic connectors 431 are available on the telescopic arm 4, such that two service openings 48, 48' are spaced apart from each other in a transversal direction of the telescopic arm 4 and are at least approximately equally spaced from the first terminal portion 41 of said telescopic arm 4. In this case, said service openings 48, 48' are located substantially in the area of said at least one hydraulic connector 431 within the external tubular bearing section 44, but at the same time also at least partially in the area of the upper surface 440 of each external tubular bearing section 44 of the telescopically conceived secondary arm 4, which may face away from the ground to provide accessibility for repairs even during extension of the crane during use.

As shown on FIG. 1, each service opening 48, 48' can be during use of the crane optionally at least partially or completely coverable with a removable cover 49.

The presence of service openings 48, 48' may enable a simple and quick replacement of a damaged hydraulic pipe 43 within the telescopic arm 4, which can be done in a few minutes and on the spot, because it can be carried out without removing and/or disassembling of said telescopic arm 4.

The cover 49 may be removed from service opening 48, 48', upon which by using of a suitable hand tool each connection between the damaged pipe 43 and corresponding hydraulic connectors 432, 432 can be disassembled, which is then followed by provisionally connecting of each replacement hydraulic pipe 43 with the faulty hydraulic pipe 43, upon which the faulty hydraulic pipe 43 is extended from the interior of the telescopic arm 4, wherein during such removal of the faulty hydraulic pipe 43 the replacement hydraulic pipe 43 is simultaneously introduced towards the interior of the telescopic arm 4. Upon removal of the faulty hydraulic pipe 43, the replacement hydraulic pipe is thus already located in its correct position and is ready to be integrated into a hydraulic circuit, for which it only needs to be disconnected from the faulty pipe and upon that connected with the hydraulic connectors 431, 432. After such reestablishment of the hydraulic circuit and replacement of the hydraulic pipe 43, and possibly air release, the crane is ready to be used again.

What is claimed is:

1. A mobile telescopic hydraulic crane, comprising:

a carrying platform, which is suitable for mounting the crane on a motor vehicle and is fitted with at least one pair of telescopic suitable legs for supporting the crane on the ground for ensuring a required carrying capacity and stability of said crane;

a platform comprising a column with a first terminal portion attached to said platform such that the column can be rotated around a vertical axis wherein a second terminal portion of said column is attached to a first terminal portion of a primary arm of the crane such that it can be pivoted around a horizontal axis, wherein said primary arm is supported on said column and can be pivoted around said horizontal axis by means of a hydraulic cylinder pivotally attached to said column and said primary arm, wherein on a second terminal portion of said primary arm, a telescopic secondary arm is attached with its first terminal portion such that it can be pivoted around the horizontal axis, wherein said telescopic secondary arm comprises an attachment point for mounting a grabber or another suitable assembly for manipulating a load, wherein said telescopic secondary arm is supported on the primary arm and can be pivoted around said horizontal axis by means of a hydraulic cylinder connected to the primary arm and to the telescopic secondary arm, wherein said telescopic secondary arm comprises at least two tubular bearing sections, which are inserted within each other, such that said at least two tubular bearing sections are moveable relative to each other in an axial direction, wherein an external tubular bearing section is connected to the primary arm and to a hydraulic cylinder, and an internal tubular bearing section within the external tubular bearing section comprises the attachment point for mounting the grabber, wherein a terminal portion of the external tubular bearing section of the telescopic secondary arm comprises at least one hydraulic connector, which enables hydraulic medium to flow from an available hydraulic aggregate, wherein a terminal portion of the internal tubular bearing section of the telescopic secondary arm comprises a first hydraulic connector and a second hydraulic connector, which enables the hydraulic medium to flow towards said grabber and/or towards its corresponding hydraulic rotational unit, wherein said first and second hydraulic connectors are connectable with each other by means of a flexible hydraulic tubing, which is connected with each of said hydraulic connectors in a hydraulically sealed and detachable manner, wherein said flexible hydraulic tubing extends along the interior of said telescopic secondary arm between the first hydraulic connector on the terminal portion of the external tubular bearing section and the second hydraulic connector on the terminal portion of the internal tubular bearing section in a transition area from the external tubular bearing section to the internal tubular bearing section and guided thereby via a guiding reel, wherein at least two service openings are provided in a terminal portion of the telescopic secondary arm, the at least two service openings positioned adjacent the first and second hydraulic connectors at a suitable distance from the terminal portion of said external tubular bearing section to provide for connecting of said flexible hydraulic tubing with each associated hydraulic connector on the terminal portion of the internal tubular bearing section, wherein said at least two service openings have a suitable shape and dimensions to allow access for a hand tool from the outside of the telescopic secondary arm to establish or disassemble said hydraulically sealed connection between said flexible hydraulic tubing and each corresponding hydraulic connector within said telescopic secondary arm, wherein said at least two service openings are cutout with rounded corners and edges, wherein the at least two service openings are spaced apart from each other in a transversal direction of the telescopic secondary arm and are at least approximately equally spaced apart from the first terminal portion of said telescopic secondary arm, wherein said at least two service openings are positioned substantially in an area of said first and second hydraulic connectors within the external tubular bearing section, and at the same time at least partially in the area of an upper surface of each external tubular bearing section of the telescopic secondary arm, facing away from the ground.

2. The crane according to claim 1, wherein said at least one service opening is positioned in the area of said first and second hydraulic connectors within the external tubular bearing section, and at least approximately in the area of an upper surface of the external tubular bearing section of said secondary arm, facing away from the ground.

3. The crane according to claim 1, wherein said at least two service openings are at least partially covered by a removable cover.

4. The crane according to claim 1, wherein said at least two service openings are completely covered by a removable cover.

* * * * *